United States Patent

Stephenson et al.

[15] 3,680,914
[45] Aug. 1, 1972

[54] MANDATORY THREE POINT SEAT BELT TONGUE SYSTEM

[72] Inventors: Robert L. Stephenson, Sterling Heights; Yogi Loomba, Roseville, both of Mich.

[73] Assignee: Allied Chemical Corporation, New York, N.Y.

[22] Filed: Sept. 25, 1970

[21] Appl. No.: 75,591

[52] U.S. Cl. ................................. 297/389
[51] Int. Cl. ............................... A44b 19/00
[58] Field of Search .......... 297/389; 24/230, 205.17; 124/134

[56] References Cited

UNITED STATES PATENTS

| | | | |
|---|---|---|---|
| 3,523,342 | 8/1970 | Spires | 24/230 |
| 3,451,720 | 6/1969 | Makinen | 297/389 |
| 3,046,982 | 7/1962 | Davis | 128/134 |
| 3,369,842 | 2/1968 | Adams, et al. | 297/389 |
| 3,473,201 | 10/1969 | Horka et al. | 24/205.17 |
| 3,523,341 | 8/1970 | Spires | 24/230 |
| 3,534,448 | 10/1970 | Hughes | 24/205.17 |
| 3,591,902 | 7/1971 | Lohr | 297/389 |

Primary Examiner—Bobby R. Gay
Assistant Examiner—Glenn O. Finch
Attorney—Jonathan Plaut

[57] ABSTRACT

The disclosure describes a vehicle lap belt securing tongue which is inserted into a buckle to connect the separate lap belt sections. The tongue, which is adapted to accept and releasably retain the anchoring end of a shoulder strap for anchoring thereof, is inoperative as a connection between the lap belt sections unless the shoulder strap is inserted and secured therein thereby changing the tongue configuration and causing it to be capable of being secured in a lap belt buckle.

6 Claims, 4 Drawing Figures

PATENTED AUG 1 1972
3,680,914
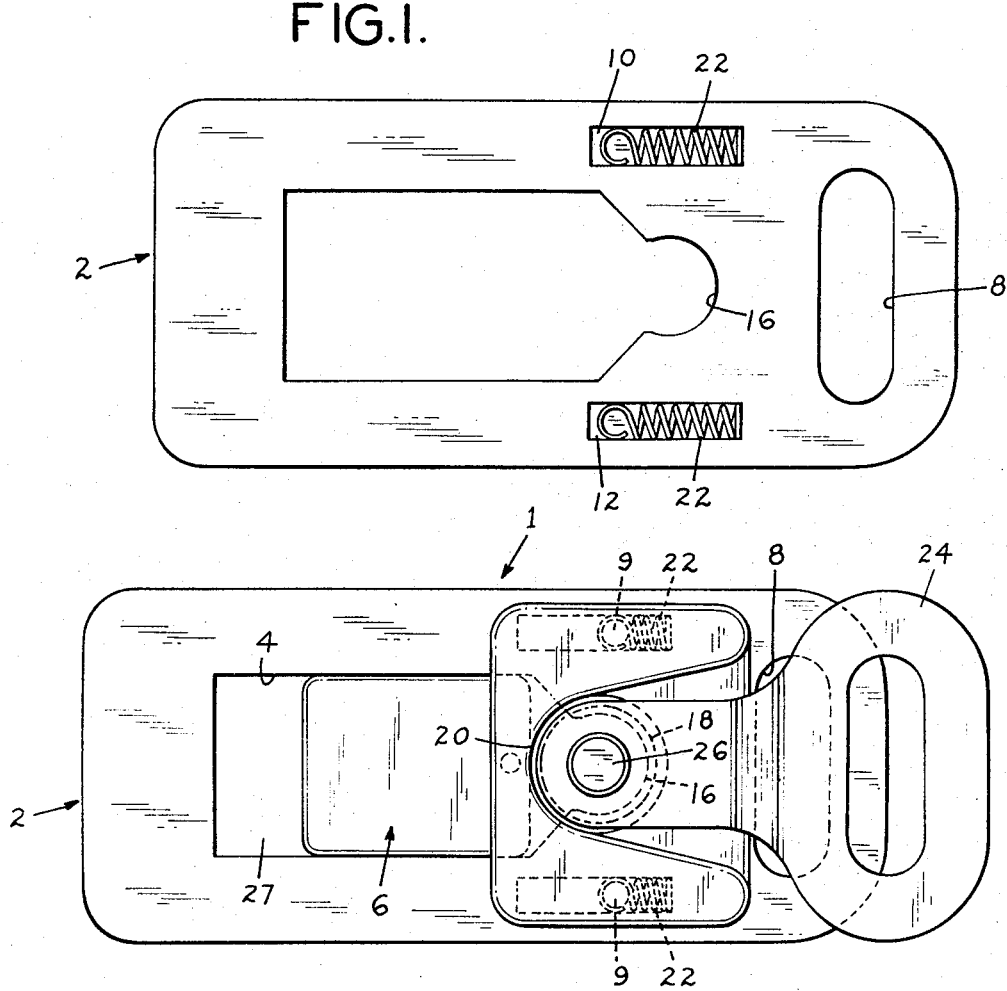
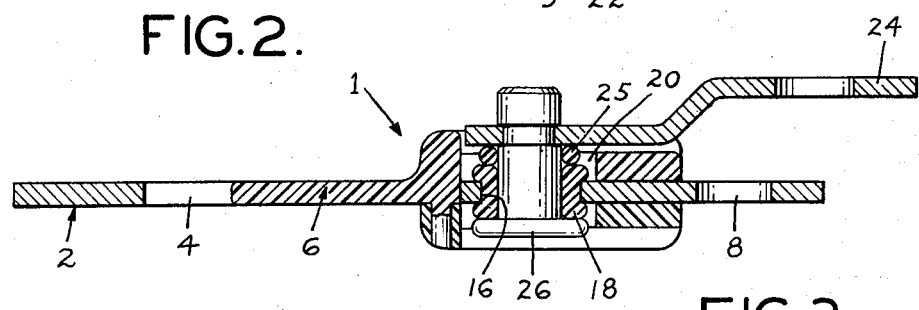
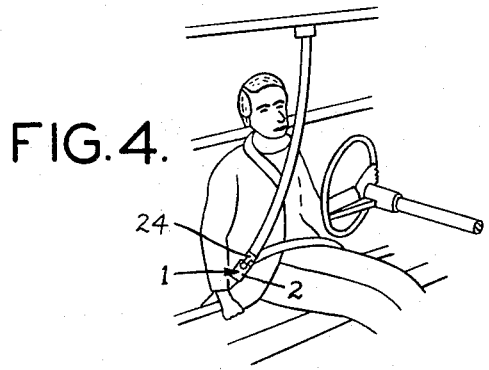
INVENTORS:
ROBERT L. STEPHENSON
YOGI LOOMBA
BY
ATTORNEY

MANDATORY THREE POINT SEAT BELT TONGUE SYSTEM

BACKGROUND

1. Field of the Invention

This invention relates to a seat belt tongue system for use as a means to connect the separate sections of a vehicle seat belt restraint system.

2. Description of the Prior Art

With the advent of vehicle occupant seat belt restraint systems comprising lap belts in combination with shoulder straps, various pieces of hardware have been designed to connect the separate belt elements of the restraint systems so that they may facilitate effective means to anchor the occupant to a vehicle structure in the event of a collision of the vehicle.

The lap belt, which is anchored to the vehicle, and which may be comprised of at least one retractable section, generally has a buckle on the end of one section and a tongue on the end of the other section which tongue is inserted into the buckle to connect the separate belt sections and to restrain the occupant from forward movement in the event of a collision of the vehicle. The shoulder strap generally extend from a location upward and slightly to the rear of the occupant, down across the occupant's torso, to an anchoring means provided in the vehicle. The anchoring means provided on the end of the shoulder strap may comprise a latch mechanism or a tongue member, for example, which may be attached to the lap belt buckle or to other anchoring means which may for example be provided at or near the lower portion of the vehicle.

The shoulder strap anchoring means of the prior art however, generally are independent of the lap restraint belts so that an occupant may use only the lap belt if he prefers to do so, and in some configurations he may use either the lap belt or the shoulder strap as he may choose. In the seat belt restraint systems where the shoulder strap is anchored to the lap belt buckle, the occupant generally must connect the lap belt sections together around his lap in order to effectively anchor the shoulder strap thereto. However, he may choose to utilize only the lap belt, in which case the use of the shoulder strap would be avoided. From a safety point of view the simultaneous use of the lap belt as well as the shoulder strap is desirable since only with the full use of the seat belt restraint system will all portions of the occupant's body be properly secured to the vehicle structure in the event of a collision thereof.

It has been the experience of many vehicle occupants to use the lap belt as a safety aid and to avoid the use of shoulder straps provided. The reasons for avoiding the use of the shoulder straps have included personal discomfort, personal dislikes or preferences and the like. Many vehicle occupants have concluded that the use of the lap belt is sufficient to protect their personal safety and that the extra time element involved in connecting the shoulder strap to the anchoring means provided is not justified. However, these reasons are clearly erroneous since it has been conclusively proven that the use of both the lap belt and the shoulder strap is desirable to properly protect the vehicle occupant in the event of a collision of the vehicle. This has been supported by statistics which have substantially demonstrated that the use of the shoulder strap is as important as the use of the lap belt in terms of the vehicle occupant's safety.

SUMMARY OF THE INVENTION

The present invention, which will be described in detail, discourages the occupant from neglecting to utilize the shoulder strap provided in a vehicle seat belt restraint system by providing a male tongue assembly, herinafter referred to simply as a tongue, which is secured to the end of one section of the lap belt, which male tongue is intended to be inserted into an accepting buckle which is secured to the other lap belt section. The buckle is adapted to releasably retain the male tongue by having a lock member which enters into a slot provided in the tongue when it is inserted into the buckle. The male tongue of the instant invention comprises a flat tongue member having an elongated cutout section adapted to accept a sliding member therein. The sliding member has two positions, one of which is a closed position, wherein the sliding member fills the entire cutout section of the flat tongue, and an open position to which the sliding member may be withdrawn which open position exposes a portion of the cutout section to full view. The portion of the cutout section which is exposed when the sliding member is withdrawn to the open position must be sufficient to provide a slot in the flat tongue member through which the lock member in the buckle may enter to secure the tongue thereto. The sliding member is biased by resilient means, as for example, springs and the like, to the closed position which completely fills the cutout section in the flat tongue member. Thus the slot in the tongue assembly through which the lap belt buckle lock member may enter is only available for entry of the lock member when the sliding member is withdrawn thereby exposing a portion of the flat tongue cutout section to full view. The sliding member is adapted to accept the shoulder strap anchoring end so that when it is inserted into the sliding member and it is withdrawn the configuration of the flat tongue member and the shoulder strap anchoring end serves to releasably secure the sliding member in the withdrawn or open position so as to provide a slot in the tongue section. However, when the shoulder strap anchoring end is removed from the tongue the sliding member is released and the resilient means causes the sliding member to return to the biased or closed position whereby it fills the entire cutout section in the flat tongue member thus eliminating the slot in the tongue.

Thus a slot is provided in the tongue only when the shoulder strap anchoring end is inserted into place within the flat tongue member and sliding member assembly. Since the slot is critical to the use of the tongue as a belt locking member in combination with a buckle provided on the other lap belt section, the tongue may not be used as such unless the shoulder strap anchoring end is inserted into the sliding member and the sliding member is withdrawn to its alternate or open position thereby exposing a portion of the cutout section to form a slot in the tongue. Thus in order to utilize the lap belt as a restraining device, the shoulder strap must be used simultaneously therewith.

It is therefore seen to be a primary object of the present invention to provide a connecting tongue for the various sections of a vehicle safety seat belt restraint system, which tongue includes a device which renders it ineffective as a connecting means between the lap belt sections unless the shoulder strap anchoring end is inserted into place therein, thus inducing the vehicle occupant to use the shoulder strap as a restraining device as well as to use the lap belt therefor.

Another object of the present invention, is to provide a connecting tongue for a vehicle safety seat belt restraint system which tongue effectively secures the separate belt sections together for use as a restraining device.

Other objects, advantages and applications of the present invention will be made apparent by following a detailed description of the preferred embodiment of the invention.

DESCRIPTION OF THE DRAWINGS

The description refers to the accompanying drawings in which like reference characters refer to like parts throughout the several views in which:

FIG. 1 is a plan view of the flat tongue member illustrating the cutout section therein;

FIG. 2 is a plan view of the flat tongue member and sliding member assembly illustrating the sliding member secured in the withdrawn position by a shoulder strap anchoring tongue;

FIG. 3 is an elevational sectional view of the flat tongue member and sliding member assembly shown in FIG. 2; and FIG. 4 is a perspective view of the entire seat belt restraint system illustrating the use of the three point tongue as a connecting device between the separate belt sections.

DESCRIPTION OF THE PREFERRED EMBODIMENT

Referring to the drawings FIG. 2 illustrates a tongue assembly 1 having a shoulder strap anchoring tongue 24 secured in position thereon. The flat tongue member 2 illustrated in FIG. 1 which is preferably constructed of metal, for example, has a cutout section 4 into which a sliding member 6, shown clearly in FIG. 2, is inserted. The sliding member 6 is preferably constructed for example of nylon, polyester, and the like. The flat tongue member 2 includes a cutout 8 through which a lap belt section is secured and separate slotted cutouts 10 and 12 into which resilient means as for example, springs, are inserted in order to bias the sliding member 6 into a closed position which completely fills the cutout section 4 in the flat tongue member 2. Pins 9 may be used to anchor the springs, for example at their free end. The sliding member 6 has a cutout 20, which is preferably circular, and which accepts a pin or button 26 supported on the end of the shoulder strap anchoring tongue 24. Part of the cutout section 4 in the flat tongue member 2 is preferably circular at tone end as is shown at 16.

When the button 26 is inserted into the circular cutout 20 in the sliding member 6 and the sliding member 6 is withdrawn to the position shown in FIG. 2 the circular cutout section 20 in the sliding member 6 aligns with the circular cutout section 16 in the flat tongue member 2. The sliding member 6 is adapted to assume a closed position which completely fills the cutout section in the flat tongue member by the use of springs 22 for example, which are inserted into the slots 10 and 12 and bias the sliding member to a closed position.

The anchoring end of the shoulder strap comprises a tongue 24 to which a pin or button is supported. A resilient bushing 18, fabricated for example of nylon, polyester and the like, is secured around the shaft of the pin or button 26. An "O" ring 25 for example may be utilized to affix the resilient bushing in position on the button 26. When the button 26 is inserted into the circular cutout section 20 of the sliding member 6, and the tongue 24 is pulled toward the circular cutout 16 in the flat tongue member 2, the springs 22 are compressed and the resilient bushing 18 on the button 26 snaps into the circular cutout 16 which is adapted to retain the button therein until removed by forcing it out. The sliding member 6 is thus held in the withdrawn position shown in FIG. 2 and a slot 27, which comprises a portion of the cutout section 4 in the flat tongue member 2 is exposed to full view. The slot 27 facilitates the use of the tongue assembly 1 as a connecting device between the separate lap belt sections by providing a passageway through which a lock member within a lap belt buckle may enter and retain the tongue. When the button 26 of the shoulder strap tongue 24 is removed from the circular cutout 16 and the sliding member 6 is permitted to return to its biased closed position thus entirely closing the cutout section 4 in the flat tongue member 2, the tongue assembly is inoperative as a connecting means between the lap belt sections since there is no slot through which a lock member in a belt buckle may enter.

Thus, in order to render the lap belt tongue effective as a connecting device between the lap belt sections it is mandatory to insert the shoulder strap anchoring end 24 into the sliding member 6 and to withdraw it to its open position. In the seat belt restraint system described the shoulder strap is intended to be anchored to a lap belt buckle to form an effective torso restraining device. An occupant must insert the shoulder strap tongue 24 into the lap belt tongue assembly 1 and withdraw the sliding member 6 to a position which causes the flat tongue and sliding member assembly to be effective as a connecting device between the lap belt sections if he wishes to use the lap belt as a restraining device. The lap belt may not be used as a restraining device unless the shoulder strap is used therewith.

While there has been herein described a preferred form of the invention, it should be understood that the same may be altered in details and in relative arrangement of parts within the scope of the appended claims.

What is claimed is:

1. In a safety belt system for a vehicle including a shoulder strap having one end fixed with respect to the vehicle and its other end fixed to a shoulder strap anchoring tongue, a pair of lap belt members each having one end fixed with respect to the vehicle, the first of said lap belt members having its other end fixed to a buckle operative to lockingly receive a three point tongue on the free end of the second lap belt in an adjustable manner to secure the lap belt members and shoulder strap together, said three point tongue comprising a flat tongue member having a forward end for insertion into the buckle receiving end and a rearward end attached to the second lap belt, said flat tongue member having a rectangular cutout section therein; a sliding member within said rectangular cutout section having a first inoperative position toward the forward end of said flat tongue member which forward position causes the sliding member to fill the rectangular cutout section to prevent entry of a buckle lock member through said rectangular cutout section, a second operative position wherein said sliding member is withdrawn toward the rearward end of said flat tongue member exposing a portion of said rectangular cutout section to permit entry of the buckle lock member; means to bias said sliding member to the first mentioned inoperative position within said rectangular cutout section; means in said three point tongue to secure the shoulder strap anchoring tongue thereon to anchor the shoulder strap to the lap belt system; means in said three point tongue to fix said sliding member in the second mentioned operative position only when said shoulder strap anchoring tongue is secured to said three point tongue; said sliding member comprises a unitary member having a thickness approximately equal to the thickness of said flat tongue member and a rectangular configuration conforming to said rectangular cutout section for approximately one-half the length of said sending member toward the forward end of said flat tongue member, and then continuing toward the rearward end of said flat tongue member in two parallel members having a space therebetween, said space being approximately equal to the thickness of said flat tongue member, said parallel members sliding over the rearward end of said flat tongue member when said sliding member is withdrawn to said second mentioned operative position.

2. The invention as described in claim 1 wherein the means to bias said sliding member to the first mentioned inoperative position within said rectangular cutout section comprises:
   a. an elongated cutout section on each side of said rectangular cutout section;
   b. a resilient spring member in each of said elongated cutout sections, said spring members having one end affixed to said sliding member and the other end affixed to said flat tongue member, said springs being adapted to bias said sliding member toward said first mentioned inoperative position.

3. The invention as described in claim 2 wherein the means to fix said sliding member in said second mentioned operative position only when said shoulder strap anchoring tongue is secured to said three point tongue comprises:
   a. a cylindrical pin supported on the shoulder strap anchoring tongue;
   b. a resilient bushing secured around the surface of said pin;
   c. a circular cutout through said sliding member to accept said cylindrical pin when it is inserted through said circular cutout; and
   d. a circular cutout section in said flat tongue member adjacent to the rearward side of said rectangular cutout section said side continuing into said circular cutout section to blend therewith, said circular cutout section having a diameter which facilitates retention of said resilient bushing when said cylindrical pin is inserted through said circular cutout in said sliding member and said pin is withdrawn with said sliding member until said resilient bushing around said pin is forced into clamping engagement within said circular cutout section in said flat tongue member thereby fixing said sliding member in said second mentioned operative position to facilitate passage of a buckle lock member through the exposed position of said rectangular cutout section in the forward end of said flat tongue member.

4. The invention as described in claim 3 wherein said sliding member is constructed of a molded synthetic resin.

5. The invention as described in claim 4 wherein said sliding member is constructed of nylon.

6. In a safely belt system for a vehicle including a shoulder strap having one end fixed with respect to the vehicle and its other end fixed to a shoulder strap anchoring tongue, a pair of lap belt members each having one end fixed with respect to the vehicle, the first of said lap belt members having its other end fixed to a buckle operative to lockingly receive a three point tongue on the free end of the second lap belt in an adjustable manner to secure the lap belt members and shoulder strap manner said three point tongue comprising:
   a. a flat tongue member having a forward end for insertion into the buckle receiving end and a rearward end attached to the second lap belt, said flat tongue member having a rectangular cutout section therein;
   b. a nylon sliding member within said rectangular cutout section, said sliding member having a unitary construction wherein a forward end is rectangular and has a thickness approximately equal to the thickness of the flat tongue member and conforms to said rectangular cutout section in said flat tongue member, and a rearward end which continues in two parallel members toward the rearward end of said flat tongue member said parallel members having a space therebetween approximately equal to the thickness of said flat tongue member said sliding member having a first inoperative position wherein it is biased toward the forward end of said flat tongue member and fills the rectangular cutout section in said flat tongue member to prevent entry of a buckle lock member therethrough, a second operative position wherein said sliding member is withdrawn toward the rearward end of said flat tongue member exposing a portion of said rectangular cutout section, said parallel members of said sliding member sliding over the rearward end of said flat tongue member;
   c. an elongated cutout section on each side of said rectangular cutout section parallel to the longer sides of said rectangular cutout sections and extending in a forward to rearward direction in said flat tongue member;
   d. a resilient coil spring in each of said elongated cutout sections, said springs having one end affixed to said sliding member and the other end affixed to said flat tongue member, said springs being adapted to bias said sliding member toward said first mentioned inoperative position;
   e. a cylindrical pin supported on the shoulder strap anchoring tongue;
   f. a resilient bushing secured around the surface of said pin;
   g. a circular cutout through said sliding member to accept said cylindrical pin when it is inserted therethrough;

h. a circular cutout section in said flat tongue member adjacent the rearward side of said rectangular cutout section said side continuing and blending with said circular cutout section, said circular cutout section having a diameter which facilitates retention of said resilient bushing when said cylindrical pin is inserted through said circular cutout in said sliding member and said pin is withdrawn with said sliding member until it is forced into clamping engagement within said circular cutout section in said flat tongue member thereby fixing said sliding member in said second mentioned operative position to facilitate passage of a buckle lock member through the exposed portion of said rectangular cutout section in the forward end of said flat tongue member.

* * * * *

PO-1050
(5/69)

UNITED STATES PATENT OFFICE
CERTIFICATE OF CORRECTION

Patent No.   3,680,914          Dated  August 1, 1972

Inventor(s)  ROBERT L. STEPHENSON and YOGI LOOMBA

It is certified that error appears in the above-identified patent and that said Letters Patent are hereby corrected as shown below:

IN THE SPECIFICATION

Column 1, line 5, delete "1." before "Field of the Invention"

Column 1, line 9, delete "2." before "Description of the Prior Art"

Column 1, line 24, "strap" should be -- straps --

Column 3, line 43, after "member 2" add -- also --

Column 3, line 54, "tone" should be -- one --

IN THE CLAIMS

Claim 3, column 6, line 3, "position" should be -- portion --

Claim 6, column 6, line 10, "safely" should be -- safety --

Claim 6, column 6, line 20, "manner" should be -- together --

Signed and sealed this 8th day of May 1973.

(SEAL)
Attest:

EDWARD M. FLETCHER, JR.
Attesting Officer

ROBERT GOTTSCHALK
Commissioner of Patents